ITED STATES PATENT OFFICE 3,709,928
Patented Jan. 9, 1973

3,709,928
PROCESS FOR PURIFYING HYDROXYALKYL-ACRYLATES OR HYDROXYALKYLMETHAC-RYLATES BY DISTILLING IN THE PRESENCE OF POLYALKYLENEGLYCOLS
Masayuki Murayama, Niigata, and Koichi Abe, Niitsu, Japan, assignors to Japan Gas-Chemical Company, Inc., Tokyo, Japan
No Drawing. Filed June 5, 1970, Ser. No. 43,929
Claims priority, application Japan, June 5, 1969, 44/44,410
Int. Cl. C07c 69/52
U.S. Cl. 260—486 B   3 Claims

ABSTRACT OF THE DISCLOSURE

A process for purifying hydroxyalkyl(meth)-acrylates by distillation, which comprises effecting said distillataion in the presence of at least one member selected from the group consisting of polyalkyleneglycols, such as polyethyleneglycols, polypropyleneglycols, etc. and those containing at least four carbon atoms in which two hydroxy groups are arranged, interposing therebetween four or more carbon atoms, such as tetramethyleneglycol.

---

The present invention relates to a process for purifying hydroxyalkylacrylates or hydroxyalkylmethacrylates to high purity with high yields.

For the commercial scale production of hydroxyalkylacrylates or hydroxyalkylmethacrylates, there have been known processes in which alkylene oxides are reacted with acrylic or methacrylic acid using any one of such catalysts as pyridine (U.S. Pat. 2,484,487), potassium methacrylate (U.S. Pat. 3,314,988), tetraalkylammonium salts (U.S. Pat. 3,059,024), ferric chloride (British Pat. 871,767) and aluminum chloride (U.S. Pat. 3,150,167). Further, there has been known a process in which a trivalent iron compound is used as a main catalyst and at least one member of the group consisting of copper, copper compounds, mercury, mercury compounds, chromium, chromium compounds and iodine is used as a co-catalyst (Japanese patent publication No. 18,890/1968).

According to these known processes for producing hydroxyalkylacrylates or hydroxyalkylmethacrylates, however, polymerization loss at the distillation step for purification of the products has been unavoidable, despite the fact that polymerization loss at the synthesis step can substantially be prevented if an ordinarily available free radical polymerization inhibitor is used. That is, according to these known processes, there are some cases where, depending on the kind of catalyst used, the catalyst precipitates in the form of a colloid at the terminal stage of the reaction of acrylic or methacrylic acid with an alkylene oxide. If the crude product is purified by distillation in the presence of such a colloidal precipitate, said precipitate adheres as an insoluble solid to the heating portion of the distillation still and it is considered that for the above reason, the heat transfer coefficient at the heating portion becomes small and additional heating is required, with the result that the decrease of distillation yield is brought about. Even in the case where the crude product has been obtained in the form of a homogeneous solution or the crude product has been subjected to distillation after separating said colloidal precipitate by filtration, an insoluble solid deposits at the terminal stage of distillation and adheres to the heating portion of the distillation still, and thus such drawbacks as mentioned above have not been avoidable.

Such polymerization loss at the distillation step has been unavoidable in the case of hydroxyalkylacrylates or hydroxyalkylmethacrylates obtained by the reaction of the sodium salt of acrylic or methacrylic acid with alkylene chlorohydrins. Further, the same result has been brought about also in the case where commercially available hydroxyalkylacrylates or hydroxyalkylmethacrylates are required to be distilled in order to be purified for some reasons such as contamination, coloration and the like. Furthermore, there are drawbacks concerning the properties of polymers produced from hydroxyalkylacrylates or hydroxyalkylmethacrylates obtained according to the above-mentioned production or distillation processes. That is, hydroxyalkylacrylates or hydroxyalkylmethacrylates are ordinarily used in the form of copolymers with other vinyl monomers. However, the copolymers sometimes suffer from slight turbidity or from gelation. This is considered ascribable chiefly to alkylene diacrylates or alkylene dimethacrylates (hereinafter referred to merely as "diesters") present in the hydroxyalkylacrylates or hydroxyalkylmethacrylates.

We made extensive studies on such various drawbacks as mentioned above which occur in the purification of hydroxyalkylacrylates or hydroxyalkylmethacrylates. As the result, we have clarified the causes therefor and a process for solving the causes, and have attained the present invention.

It is as mentioned previously that in the distillation step in a process for producing hydroxyalkylacrylates or hydroxyalkylmethacrylates from acrylic or methacrylic acid and alkylene oxides, an insoluble solid adheres to the heating portion of the distillation still, so that the heat transfer at the heating portion becomes inferior to make it necessary to heat said heating portion to a temperature considerably higher than that anticipated from the boiling point thereof. We have found that such heating causes the formation of the diesters from hydroxyalkylacrylates or hydroxyalkylmethacrylates. In addition thereto, we have found the following facts. Due to its easily polymerizable nature, such diester is apt to polymerize at the heating portion of the distillation still, whereby a gelled insoluble polymer adheres to the heating portion to decrease the heat transfer coefficient. In order to operate the distillation effectively, therefore, further heating is required to bring about such a vicious circle that the formation of the diester is promoted accordingly. Thus, owing to the formation and polymerization of the diester, the polymerization loss at the distillation step is unavoidable, with the result that not only the increase of distillation yield becomes difficult but also the diester distills out into the end product.

The present invention has overcome such drawbacks encountered in the distillation step, and the object of the present invention can be successfully accomplished by adding polyalkyleneglycols to crude hydroxyalkyl acrylates or hydroxyalkylmethacrylates and subjecting the resulting mixtures to distillation.

Effects attained in accordance with the present process are as follows:

The first effect is that the increase in amount of diester formed is inhibited by addition of a polyalkyleneglycol. This effect attained by addition of a polyalkyleneglycol is extremely great and, even when a polyalkyleneglycol is added in a markedly small amount based on the amount of crude hydroxyalkyl acrylate or hydroxyalkyl methacrylate, no material adheres to the heating portion of the distillation still and the by-production of diester can be completely inhibited. This cannot be experienced in a case where a mere high boiling solvent has been added and is an entirely unexpected and unpredictable effect. For example, even if dioctylphthalate, as an example of a high boiling solvent, has been added in an amount of 1 to 30% by weight, a solid adheres to the heating portion of the distillation still, and the amount of diester in the distillate increases. Further, the same result is brought about even when there is used a high boiling, polar solvent such as glycerin.

The second effect is that the catalyst used is prevented from adhering in the form of an insoluble solid to the heating portion of the distillation still. Accordingly, no filtration operation is required even in the case where a catalyst has been used which precipitates as a colloid at the terminal stage of the reaction, whereby the cost of the end product can be made low and the maintenance of the distillation still is simple. Accordingly, this effect is entirely unexpected, like the first effect.

In accordance with the present invention, the polymerization loss at the distillation step can be prevented by virtue of such effects as mentioned above, and not only is the distillation yield extremely high and reaches, ordinarily, 94 to 96 wt. percent or more but also high purity and high quality hydroxyalkylacrylates or hydroxyalkylmethacrylates can be obtained on commercial scale.

Polyalkyleneglycols usable in the present invention include homopolymers and copolymers of alkylene oxides which are ordinarily called polyethyleneglycols, polypropyleneglycols, polybutyleneglycols, etc. and polymethylenediols such as tearamethyleneglycol, 1,4-pentanediol, etc.

However, it is not desirable that the polyalkyleneglycols added according to the present process distill out together with hydroxyalkylacrylates or hydroxyalkylmethacrylates, which are the end products, at the time of distillation thereof. Accordingly, the polyalkyleneglycols to be used in the present invention should be those which are higher in boiling point than the end products. In some cases, the above-mentioned polyalkyleneglycols are in the form of solids, but the use of solid polyalkyleneglycols is not particularly objectionable. Considering the above facts, particularly preferable polyalkyleneglycols usable in the present invention are polyethyleneglycols or polypropyleneglycols represented by the formula

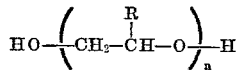

wherein R is H or $CH_3$, and $n$ is an integer of 3 to 20, and polyalkyleneglycols containing at least 4 carbon atoms in which two hydroxyl groups have been arranged, interposing therebetween 4 or more carbon atoms, and which have 4 to 10 carbon atoms. Concrete examples of polyalkyleneglycols belonging to the above-mentioned group are tetramethyleneglycol, 1,4-pentanediol, 1,4- and 2,5-hexanediols, pentamethyleneglycol, 1,5-hexanediol, hexamethyleneglycol and heptamethyleneglycol.

In the present invention, the above-mentioned polyalkyleneglycols may be used either singly or in the form of mixtures, and sufficiently display their effects when added in an amount of at least 0.5 wt. percent, preferably 1 to 10 wt. percent, based on the weight of crude hydroxyalkylacrylate or hydroxyalkylmethacrylate. Even if the polyalkyleneglycol is added in excess of the said amount, no detrimental effect is brought about, but the addition thereof in excessively large amount is not advantageous in view of the cost of the resulting product. Ordinarily, the polyalkyleneglycol is added prior to distillation of crude hydroxyalkylacrylate or hydroxyalkylmethacrylate. However, even when it is added during the synthesis step, no change in effect thereof is observed at all. Accordingly, this mode is within the scope of the present invention.

As the crude hydroxyalkylacrylates or hydroxyalkylmethacrylates which are to be subjected to distillation, there may be used as they are any of the reaction products obtained by reacting alkylene oxides with acrylic or methacrylic acid in the presence of the aforesaid catalyst, or the reaction products obtained by reacting the sodium salt of acrylic or methacrylic acid with alkylene chlorohydrins. Further, the present invention is successfully applicable to the case where purified products, which have been colored with lapse of time or contaminated for certain causes, are required to be re-distilled. Thus, this mode is also within the scope of the present invention.

We have further found a process for the synthesis of hydroxyalkylacrylates or hydroxyalkylmethacrylates by reacting alkylene oxides with acrylic or methacrylic acid in the presence of a trivalent iron compound as a main catalyst and in the presence or absence of a co-catalyst, in which the formation of diesters and the coloration of products can be effectively inhibited by addition of a divalent tin compound at the terminal stage of the reaction or at the time of distillation. By "terminal stage" is meant not necessarily the point at which the conversion reaction is complete, but rather a point at which it is desired to terminate the conversion reaction, for example, at a point before the corresponding diesters of the hydroxyalkylacrylates or hydroxyalkylmethacrylates are formed. It is quite effective for inhibiting the formation of diesters and preventing the coloration of products to carry out the present process in combination with the above-mentioned process in such a manner that the reaction is terminated by addition of a divalent tin compound and then the reaction product is purified by distillation in the presence of a polyalkyleneglycol; a liquid reaction product synthesized in the presence of a polyalkyleneglycol is charged with a divalent tin compound to terminate the reaction and then the reaction product is purified by distillation; or a polyalkyleneglycol and a divalent tin compound are added at the time of distillation of the reaction product. These procedures are preferred modes of practice of the present invention.

The synthesis of hydroxyalkylacrylates or hydroxyalkylmethacrylates is effected in the presence of such a common free radical polymerization inhibitor as hydroquinone, tannic acid, phenothiazine, diphenylamine, N,N'-di-2-naphthyl-p-phenylenediamine, paramethoxyphenol, 2,6-di-t-butyl-p-cresol or 2,5-di-t-butyl hydroquinone.

Explanation is made below with respect to a comparison between the cases where, to the hydroxyethylmethacrylate synthesis reaction liquid obtained in Example 2, there were added, individually, a polyalkyleneglycol (same as Example 2), dioctylphthalate (Comparative Example 1), and no such compound (Comparative Example 2).

TABLE 1

| | Additive at the time of distillation (20 g.) | Reaction yield (mol percent) | Distillation yield (wt. percent) | Composition of product | | | Hue of product (APHA) | Material adhered to heating portion of distillation still |
|---|---|---|---|---|---|---|---|---|
| | | | | HEMA wt. percent) | MAA wt. percent) | EDMA wt. percent) | | |
| Example 2 | Triethyleneglycol | 97.0 | 96.0 | 98 | 0.4 | 0.2 | 2 | Not observed. |
| Comparative example: | | | | | | | | |
| 1 | Dioctylphthalate | 97.0 | 93.0 | 98 | 0.4 | 0.3 | 2 | Observed. |
| 2 | None | 97.0 | 93.5 | 98 | 0.4 | 0.3 | 2 | Do. |

In the table:

Reaction yield $$=\frac{\text{Mol of produced hydroxyethylmethacrylate}}{\text{Mol of fed methacrylic acid}} \times 100$$

Distillation yield $$=\frac{\text{Weight of distilled hydroxyethylmethacrylate}}{\text{Weight of fed crude hydroxyethylmethacrylate}} \times 100$$

HEMA_____ Hydroxyethylmethacrylate.
MAA_____ Methacrylic acid.
EDMA_____ Ethylenedimethacrylate.

As seen in Comparative Example 1, when dioctylphthalate is added as an additive at the time of distillation, the distillation yield is 93 wt. percent and is 3% lower than that in Example 2, and the amount of ethylenedimethacrylate is 0.3 wt. percent and is 0.1% more than that in Example 2. These values do not substantially differ from the case of the non-additive of Comparative Example 2. A great difference between these examples is that according to each of the Comparative examples, a solid adheres to the still. If this solid is left unremoved, the subsequent distillation becomes difficult. However, there is no suitable solvent capable of dissolving said solid. Accordingly, the solid must be scraped off by mechanical means to bringing about a marked disadvantage from an industrial standpoint. According to Example 2, in which triethyleneglycol was added at the time of distillation, no solid adhered to the still, and the distillation yield was as high as 96 wt. percent and the amount of ethylenedimethacrylate was 0.2 wt. percent. Thus, the effects attained by addition of polyalkyleneglycols are extremely great, and the present process is markedly high in value as a commercial scale purification process.

The present invention is illustrated in further detail below with reference to examples.

EXAMPLE 1

A mixture comprising 360 g. of acrylic acid, 0.3 g. of hydroquinone and 4 g. of ferric chloride as a catalyst was charged in a reactor and was heated to 80° C. after flushing the reactor with nitrogen gas. Then, ethylene oxide in the form of gas was injected at a rate of 40 g./hr. When the reaction was continued for 6 hours, the amount of unreacted methacrylic acid became 0.3 wt. percent, so that 10 g. of stannous chloride were immediately added to terminate the reaction. The resulting crude hydroxyethylacrylate was charged with 15 g. of polyethyleneglycol (average molecular weight is about 200) and then subjected to simple distillation under 4 mm. Hg abs. to obtain 54 g. of a product which was composed of 98 wt. percent of hydroxyethylacrylate, 0.3 wt. percent of acrylic acid and 0.2 wt. percent of ethylene diacrylate. No solid had adhered to the still.

EXAMPLE 2

A mixture comprising 430 g. of methacrylic acid, 1 g. of hydroquinone, and a catalyst composed of 0.8 g. of ferric chloride and 1.5 g. of sodium bichromate was charged in a reactor and heated to 80° C. after flushing the reactor with nitrogen gas. Then, ethylene oxide in the form of a liquid was injected at a rate of 180 g./hr. When the reaction was continued for 1 hour and 20 minutes, the amount of unreacted methacrylic acid became 0.4 wt. percent, so that 2 g. of stannous chloride were immediately added to terminate the reaction. The resulting crude hydroxyethylmethacrylate was charged with 20 g. of triethyleneglycol and then subjected to simple distillation under 4 mm. Hg abs., to obtain 624 g. of a product with a hue of APHA 2 which was composed of 90 wt. percent of hydroxyethylmethacrylate, 0.4 wt. percent of methacrylic acid and 0.2 wt. percent of ethylene dimethacrylate. No adhesion of solid to the still was observed at all.

The above procedures were repeated by subjecting said crude hydroxyethylmethacrylate together with 20 g. of 1,4-pentanediol to simple distillation under 5 mm. Hg abs. The substantially same results were obtained.

EXAMPLE 3

A mixture comprising 360 g. of acrylic acid, 0.3 g. of diphenylamine and 4 g. of tetramethylammonium chloride as a catalyst was fed to an autoclave. After flushing the system with nitrogen gas, 350 g. of propylene oxide was fed, and the mixture was reacted at 80° C. for 7 hours. The resulting crude hydroxypropylacrylate was charged with 20 g. of tetrapropylene glycol and then subjected to simple distillation under 5 mm. Hg abs. to obtain 615 g. of a product which was composed of 96 wt. percent of hydroxypropylacrylate, 2.5 wt. percent of acrylic acid and 0.1 wt. percent of propylene diacrylate. The adhesion of solid to the still was not observed at all.

The above procedures were repeated but subjecting the said crude hydroxypropylacrylate together with 30 g. of hexamethyleneglycol to simple distillation under 5 mm. Hg abs. Substantially the same results were obtained.

EXAMPLE 4

A mixture comprising 430 g. of methacrylic acid, 1 g. of phenothiazine and a catalyst composed of 1 g. of ferric nitrate and 1 g. of cupric chloride was charged in a reactor and heated to 70° C. after flushing the reactor with nitrogen gas. Then, propylene oxide was injected at a rate of 200 g./hr. The reaction was complete in a period of 2 hours. Then resulting crude hydroxypropylmethacrylate was charged with 10 g. of polyethyleneglycol (average molecular weight is about 600) and then subjected to simple distillation under 4 mm. Hg abs. to obtain 688 g. of a product which was composed of 98 wt. percent of hydroxypropylmethacrylate, 0.2 wt. percent of methacrylic acid and 0.1 wt. percent of propylene dimethacrylate. The adhesion of solid to the still was not observed at all.

EXAMPLE 5

A mixture comprising 430 g. of methacrylic acid, 0.5 g. of p-methoxyphenol and a catalyst composed of 1 g. of ferric bromide and 1.5 g. of mercurous acetate was charged in a reactor and heated to 80° C. after flushing the reactor with nitrogen gas. Then, butylene oxide was injected at a rate of 130 g./hr. When the reaction was continued for 3 hours, the amount of unreacted methacrylic acid became 0.2 wt. percent, so that 3 g. of stannous chloride were immediately added to terminate the reaction. The resulting crude hydroxybutylmethacrylate was charged with 15 g. of polypropyleneglycol (average molecular weight is about 300) and then subjected to simple distillation under 2 mm. Hg abs. to obtain 749 g. of a product which was composed of 98 wt. percent of hydroxybutylmethacrylate, 0.2 wt. percent of methacrylic acid and 0.1 wt. percent of butylene dimethacrylate. The adhesion of solid to the still was not observed at all.

EXAMPLE 6

A mixture comprising 178 g. of sodium methacrylate (purity 97%), 410 g. of ethylene chlorohydrin and 2.5 g. of hydroquinone was heated and reacted with stirring at a reflux temperature for 2 hours. After the reaction, the reaction product was cooled to room temperature, and then a salt formed was separated by filtration to obtain 485 g. of a filtrate containing 45.0 wt. percent of hydroxyethylmethacrylate. This filtrate was first subjected to reduced pressure distillation to remove excess ethylene chlorohydrin, and was then charged with 10 g. of tetrapropyleneglycol and subjected to simple distillation under 4 mm. Hg abs. to obtain 211 g. of a product which was composed of 98 wt. percent of hydroxyethylmethacrylate, 0.2 wt. percent of acrylic acid and a trace amount of ethylene diacrylate. The adhesion of solid to the still was not observed at all.

EXAMPLE 7

A mixture comprising 500 g. of a commercially available hydroxyethylmethacrylate which had been colored due to storage for a long period of time (hue: APHA 100), 10 g. of polyethyleneglycol (average molecular weight is about 600) and 3 g. of hydroquinone was subjected to simple distillation under 5 mm. Hg abs. to obtain 496 g. of a product with a hue of APHA 2 which was composed of 96 wt. percent of hydroxyethylmethacrylate, 0.5 wt. percent of methacrylic acid and 1.0 wt. percent of ethylene dimethacrylate. The adhesion of solid to the still was not observed at all.

The same mixture as above, except that the polyalkyleneglycol was not contained therein, was subjected to the same distillation as above to obtain a product with a hue of APHA 80.

We claim:

1. A process for purifying hydroxyalkylacrylates or hydroxyalkylmethacrylates by distillation, which comprises effecting said distillation in the presence of at least one compound selected from the group consisting of polyalkyleneglycols of the formula

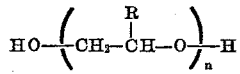

wherein R is hydrogen atom or methyl and $n$ is an integer of 3 to 20 polyalkyleneglycols containing at least four carbon atoms in which two hydroxy groups are arranged, interposing therebetween four or more carbon atoms and having a total number of carbon atoms of 4 to 10, said polyalkyleneglycols having a boiling point higher than those of the hydroxyalkylacrylates or hydroxyalkylmethacrylates to be purified and recovering the purified hydroxyalkylacrylates or hydroxyalkylmethacrylates as overhead.

2. A process as claimed in claim 1, wherein the polyalkyleneglycol is used in an amount of more than 0.5% by weight based on the weight of the hydroxyalgylacrylates or hydroxyalkylmethacrylates to be purified.

3. In a process for producing highly pure hydroxyalkylacrylates or hydroxyalkylmethacrylates which comprises reacting acrylic or methacrylic acid with a lower alkylene oxide in the presence of a catalyst containing at least a trivalent iron compound, adding a divalent tin compound to the reaction system at the terminal stage of the reaction, the improvement which comprises distilling the produced hydroxyalkylacrylates or hydroxylkylmethacrylates in the presence of at least one compound selected from the group consisting of polyalkyleneglycols of the general formula

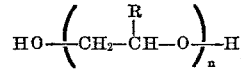

wherein R is hydrogen atom or methyl and $n$ is an integer of 3 to 20 and polyalkyleneglycols containing at least four carbon atoms in which two hydroxy groups are arranged, interposing therebetween four or more carbon atoms and having a total number of carbon atoms of 4 to 10, said polyalkyleneglycols having a boiling point higher than those of the hydroxyalkylacrylates or hydroxyalkylmethacrylates to be purified, said compound being present in an amount of more than 0.5% by weight based on the weight of the hydroxyalkylacrylates or hydroxyalkylmethacrylates to be purified and recovering the purified hydroxyalkylacrylates or hydroxyalkylmethacrylates as overhead.

References Cited

UNITED STATES PATENTS

| | | | |
|---|---|---|---|
| 3,067,222 | 12/1962 | Anderson | 260—486 B |
| 3,441,599 | 4/1969 | Murayama | 260—486 B |
| 2,484,487 | 10/1949 | Caldwell | 260—486 B |
| 3,059,024 | 10/1962 | Goldberg et al. | 260—486 B |
| 3,150,167 | 9/1964 | Wright et al. | 260—486 B |
| 3,314,988 | 4/1967 | Nemec et al. | 260—486 B |

FOREIGN PATENTS

| | | | |
|---|---|---|---|
| 871,767 | 6/1961 | Great Britain | 260—486 B |

WILBUR L. BASCOMB, JR., Primary Examiner

U.S. Cl. X.R.

203—8, 38, 64, DIG 21

UNITED STATES PATENT OFFICE
CERTIFICATE OF CORRECTION

Patent No. 3,709,928          Dated January 9, 1973

Inventor(s) MURAYAMA, MASAYUKI, ET. AL.

It is certified that error appears in the above-identified patent and that said Letters Patent are hereby corrected as shown below:

Column 1, in the heading, line 7, "Japan Gas-Chemical Company, Inc., Tokyo, Japan" should read -- Mitsubishi Gas-Chemical Company, Inc., Tokyo, Japan -- .

Signed and sealed this 25th day of December 1973.

(SEAL)
Attest:

EDWARD M. FLETCHER, JR.          RENE D. TEGTMEYER
Attesting Officer                  Acting Commissioner of Patents